Jan. 23, 1968  YOICHI UCHIYAMA  3,364,841
SLIDABLY MOUNTED PERFORATED SHEETS
Filed Oct. 5, 1965  5 Sheets-Sheet 2
FIG. 5
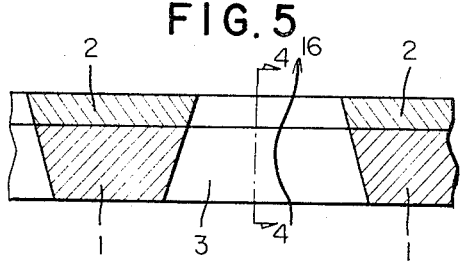
FIG. 6
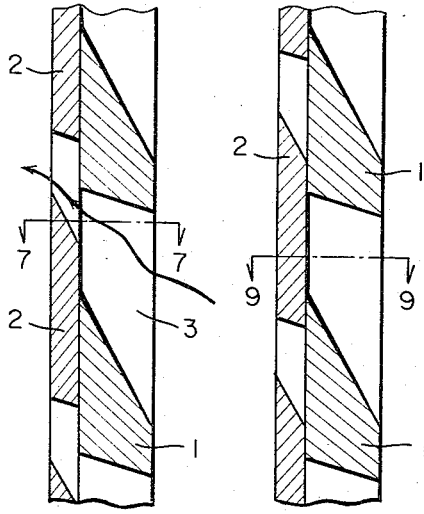
FIG. 8
FIG. 7
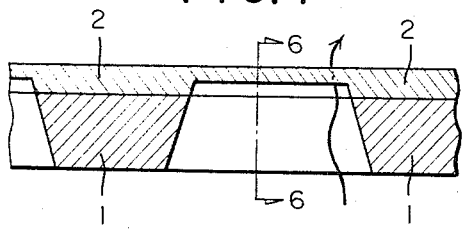
FIG. 9
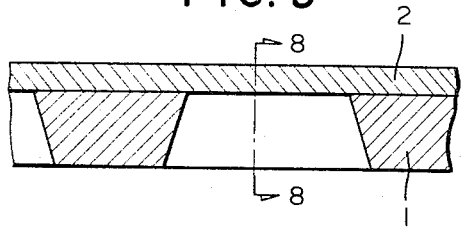
FIG. 10
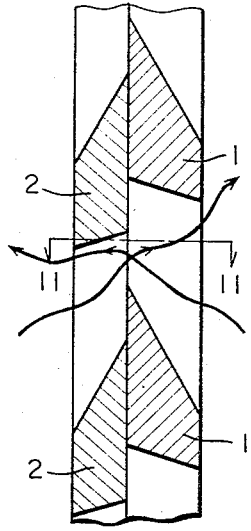
FIG. 12
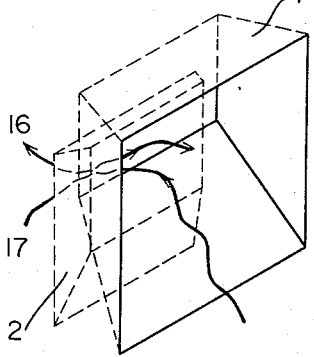
FIG. 13
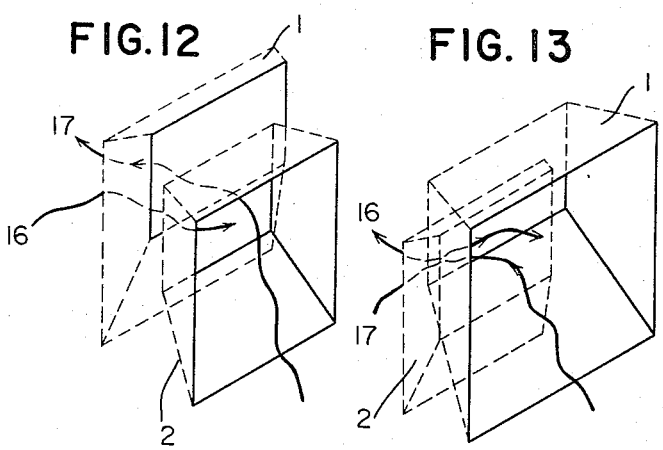
INVENTOR.
Yoichi Uchiyama
BY
Wenderoth, Lind & Ponack
Attorneys Jan. 23, 1968   YOICHI UCHIYAMA   3,364,841
SLIDABLY MOUNTED PERFORATED SHEETS
Filed Oct. 5, 1965   5 Sheets-Sheet 4

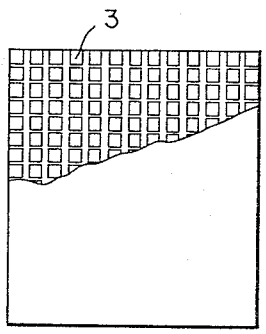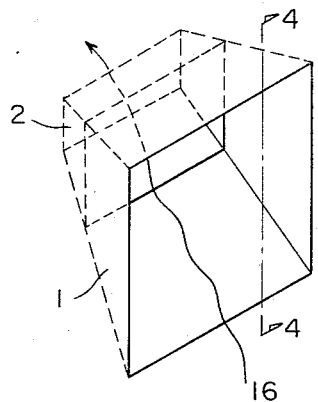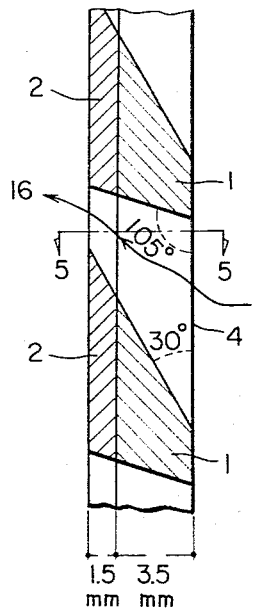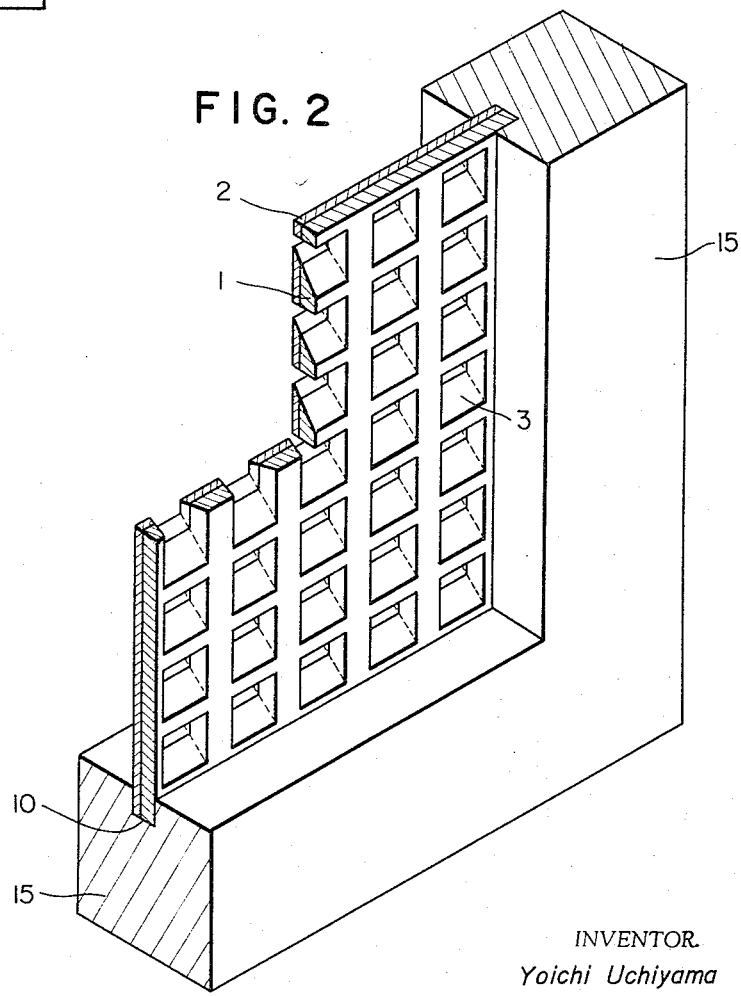

INVENTOR.
Yoichi Uchiyama
BY
Wenderoth, Lind & Ponack
attorneys

Jan. 23, 1968  YOICHI UCHIYAMA  3,364,841
SLIDABLY MOUNTED PERFORATED SHEETS
Filed Oct. 5, 1965  5 Sheets-Sheet 5

INVENTOR.
Yoichi Uchiyama
BY

United States Patent Office 3,364,841
Patented Jan. 23, 1968

3,364,841
SLIDABLY MOUNTED PERFORATED SHEETS
Yoichi Uchiyama, 1247 Katta-machi, Kohoku-ku,
Yokohama, Japan
Filed Oct. 5, 1965, Ser. No. 493,168
Claims priority, application Japan, Oct. 20, 1964,
39/59,318
4 Claims. (Cl. 98—96)

ABSTRACT OF THE DISCLOSURE

A two-sheet assembly consisting of a first perforated sheet having a number of tapered openings and a second sheet having similar openings adapted to be mounted in a window, door or the like for ventilation. The second sheet is slidably mounted against the first sheet. The openings of the second sheet taper in the same direction and at the same angle as the openings of the first sheet, and when the openings in two sheets coincide, they form a single uniformly tapered bore through both sheets.

---

The present invention relates to a window construction for use in houses and buildings, and more particularly, to a novel and improved perforated pane or sheet having a number of tapering or flaring openings for ventilation.

In the past, many attempts have been made to provide a satisfactory ventilating means adapted for a window or door. Up to date, however, there has never existed a desirable and satisfactory means for ventilation to be fixed in the window or door in which it is of a simple construction as well as of an easy operation, and further, of low cost of manufacture adapted for mass production. In general, it is preferred that the glass pane window should be always open in the daytime in order to provide a free and satisfactory ventilation from window to indoors or vice versa in summer. However, the windows have to be shut in the evening so as to prevent mosquitoes or other insects from coming into the room. To this end, it is necessary to install an insect repellent screen before a window, which means an additional expense and labor. Further, in case of a sudden heavy rain, such as a shower, or a heavy rain together with a strong wind, such as a storm, the window must be shut hurriedly to prevent the rain water from pouring into the room. In summer, too, the sunshine is so hot and scorching that a curtain or blind is required to obstruct it. It should be borne in mind that, in either rain or sunshine, ventilation is made the sacrifice of by other purposes.

Again, in case of a strong wind outdoors, a considerable lot of dust invades indoor with it. Besides, where there is a great din outdoors, the provision of soundproofness is a matter of prime importance. It is also necessary to provide a means not to enable some one to peep into the room through the transparent glass pane.

The present invention contemplates to overcome the above disadvantages of the window construction of prior art, and, briefly stated, the invention contemplates to provide a multi-purpose perforated sheet which can be easily installed in the window or door, and which comprises a sheet having a number of tapering openings for ventilation of desired section.

Therefore, a principal object of the invention is to provide a perforated glass pane or a perforated synthetic plastic sheet which can be fixed in a window or door in order to provide a satisfactory ventilation as well as air cleaning together with the prevention of insect, dust, wind, rain and hot sunshine.

It is another object of the invention to provide a multi-purpose perforated sheet in which the material therefore is selected from the group consisting of glass pane, modified glass pane, glass pane reinforced with metal wire, synthetic resin sheet, synthetic resin sheet reinforced with metal, laminated sheet of various composition, ceramic or concrete slab and the like.

It is an additional object of the invention to provide a dependable perforated sheet which can be manufactured by a simple process adapted for mass production, can be easily fixed in the window or door, can be manually and conveniently operated.

Other objects and advantages of the invention will be apparent as it is better understood from the following description, which, taken in connection with the accompanying drawings, discloses a preferred embodiment thereof.

Referring to the drawings:

FIG. 1 is a plan view showing one side of the multi-purpose perforated sheet of this invention on a reduced scale wherein part of the number of ventilating openings is shown, but the openings are provided all over the sheet.

FIG. 2 is a fragmentary perspective view of an assembly comprising two perforated sheets, principal and auxiliary ones, laminated together, one of the two sheets being stationary and the other slidable with respect to the former, provided in the window frame, wherein a dotted line shows a corner in a ventilating opening, and an open condition is shown in which each of the openings of the principal sheet coincides with each of those of the auxiliary one, the direction of an arrow showing that of air flow 16.

FIG. 3 is a perspective view of a single ventilating opening of the perforated sheet of this invention on an enlarged scale wherein the same open condition as that of FIG. 2 is shown in which each of the openings coincides with each of other ones, and this view illustrates the opening end of large diameter, the direction of an arrow showing an air flow.

FIG. 4 is a longitudinal sectional view of the perforated sheet taken along the line 4—4 of FIG. 3, showing the coincidence of each ventilating opening of both principal and auxiliary sheet to form a piercing slot of tapering section.

FIG. 5 is a horizontal sectional view of the sheet along the line 5—5 of FIG. 4.

FIG. 6 is an enlarged sectional view showing a semi-open condition wherein auxiliary sheet is a little displaced with respect to the principal one.

FIG. 7 is a sectional view taken along the line 7—7 of FIG. 6.

FIG. 8 is an enlarged sectional view showing a closed condition in which each opening of both principal and auxiliary sheet is wholly closed by the displacement thereof.

FIG. 9 is a sectional view taken along the line 7—7 of FIG. 8.

FIG. 10 is an enlarged sectional view showing a semi-open condition of the two sheet assembly wherein the opposite side of the auxiliary one faces to one side of the principal one.

FIG. 12 is a similar view as that of FIG. 10, showing an enlarged perspective view wherein an air ingress 16 and an air egress 17 are indicated indoors.

FIGURE 13 is a perspective view showing the opposite side of FIG. 12, i.e., outdoors.

Figure 11:
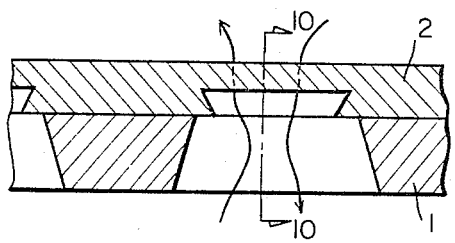
FIG. 11 is a sectional view taken along the line 11—11 of FIG. 10.
Figure 14:
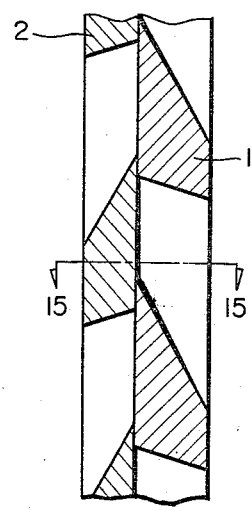
FIG. 14 is an enlarged sectional view showing the closed condition as similar an assembly as shown in FIG. 10.
Figure 15:
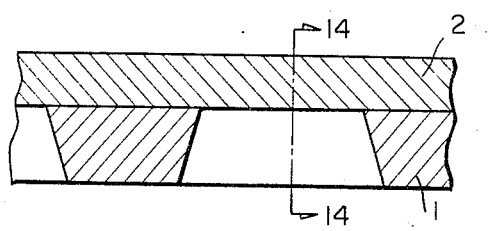
FIG. 15 is a sectional view taken along the line 15—15 of FIG. 14.
Figure 16:
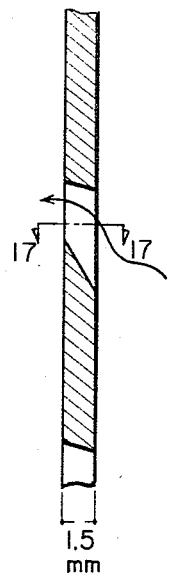
FIGS. 16–21 show enlarged longitudinal and horizontal sectional views respectively, illustraing the sizes and tapering angles of respective ventilating opening of the perforated sheet depending on the thickness thereof in accordance with the present invention.
Figure 18:
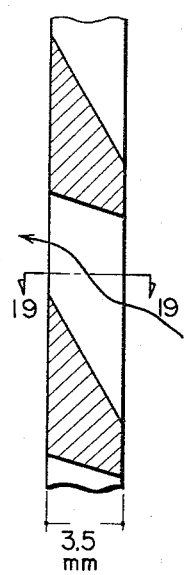
Figure 17:
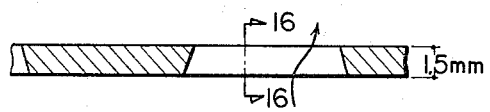
Figure 19:
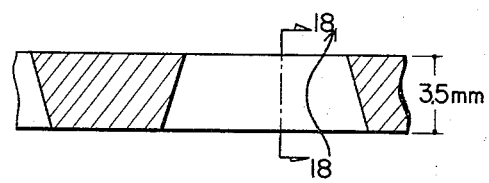
Figure 21:
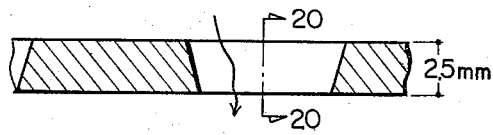
Figure 20:
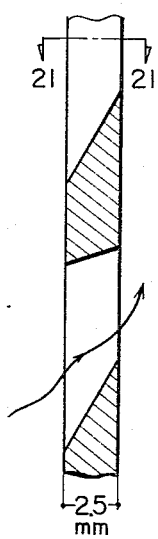

The perforated sheet of this invention is described in detail hereinbelow in connection with the accompanying drawings. Briefly stated, the multi-purpose perforated sheet comprises a sheet having a number of openings. A sheet material adapted for the present invention can be selected from the group consisting of glass pane, synthetic resin sheet, ceramic or concrete slab, synthetic resin sheet reinforced with metal wire or net, and glass pane reinforced with metal wire or net.

The perforated sheet of this invention can be employed as a single sheet, but a principal object of this invention consists in the use of an assembly of two perforated sheets laminated together wherein one sheet is firmly secured to a window frame or sash and the other sheet is mounted so as to be slidable up and down or left and right or in any desired direction with respect to the stationary one. When the above assembly of two perforated sheets laminated together is fixed in the window frame or the like, it is arranged that each opening of one sheet coincides with that of the other sheet to form a piercing bore so that air flows through the bore freely while, on the other hand, the opening can be closed by sliding a slidable sheet in any desired direction with respect to the stationary one and the air flow is obstruced between indoors and outdoors.

As described above, the perforated sheet of this invention comprises a sheet of a very simple construction in principle. However, on an extensive study of research, I have invented a novel and improved perforated sheet in connection with the size, shape, section and arrangement of an individual ventilating opening thereof in order to enhance the ventilation efficiency together with the multi-purpose thereof. By this novel construction, not only the ventilation efficiency but also many other purposes can be realized.

A plan view of the perforated sheet of this invention is shown in FIG. 1, and a perspective view of FIG. 2 shows a preferred embodiment of the invention in detail. In FIG. 2, the assembly comprising two perforated sheets, principal 1 and auxiliary 2, of this invention is fixed into a groove 10 of the frame 15 of a window, door and the like, and part of the perforated sheet assembly is removed for the purpose of clarity. In FIG. 2, this assembly shows an open condition in which each ventilating opening 3 of the principal sheet 1 coincides with that of the auxiliary sheet 2 (partly shown) to form a piercing bore for air flow passage. An enlarged view of an individual ventilating opening 3 is shown in FIG. 3 which clearly illustrates the shape and section of the ventilating opening 3, one of the features of this invention. This opening 3 is formed into a tapering bore of rectangular or circular section, and is preferred to be of trapezoidal section.

An air flow moves through the opening to the direction of an arrow 16 in FIG. 3. As the ventilating opening 3 of the principal sheet has a tapering form, it is understood that it has an opening end of large diameter 4 on one side and an opening end of small diameter 5 on the opposite side of the sheet. As clearly shown in FIG. 3, the air flow advances from the opening end of large diameter 4 of the ventilating opening 3 of the principal sheet to the opening end of small diameter 5 thereof, then through the opening end of large diameter of the auxiliary sheet attached to the principal one and again through the opening end of small diameter thereof and discharges therefrom.

When the opening end of large diameter 4 of the principal sheet 1 faces outward with respect to the window, the open air tends to enter the end 4 or be absorbed thereinto because the ventilating opening is of a tapering body. If the ventilating opening 3 is not of a tapering form, but of the same size and diameter throughout the length thereof including both ends, it follows that air will not flow towards the opening 3 unless the open air advances thereto. Of course, where there is temperature or pressure difference between indoors and outdoors, the air flow is accelerated.

In addition, the top side of the ventilating opening of rectangular section of the perforated sheet of this invention makes an angle of about 105° to the plane of the opening end of large diameter and the bottom side thereof makes an angle of about 30° to the same plane of the opening end of large diameter as clearly shown in the sectional view of FIG. 4. Accordingly, it does not follow that the sheet of this invention is provided with a number of simple tapering slots.

The reason why the tapering opening 3 is provided at the above oblique angle to the plane of the sheet is as follows: that the opening is thus oblique in the upward direction contemplates to prevent the open air from invasion to some extent, and, in case of wind, rain and snow, prevent them from entering through the opening of the auxiliary sheet into the room due to the upwardly slanting opening.

As described above, the opening of the perforated sheet of this invention is formed with an upwardly slanting slot from its end of large diameter, therefore, in case of a strong wind and rain or snow with a strong wind, the perforated sheet can absorb any of them by diffusing or dispersing an intense mass of fluid pushing to the window with a highly oriented gigantic energy, and besides, rain or snow forms a water drop and trickles down the slanting inner face of the opening. As a result, when a shower with a strong wind falls in summer, the increase of room temperature resulting from a sudden shut of windows can be avoided.

As is known, when the air flow is obstructed by a wall or a sheet in a house or building, there happens a difference of atmospheric pressure across the barrier wall due to the temperature or humidity difference. If, therefore, the barrier wall is provided with an opening, an air flow naturally takes place towards and through the opening.

With a view to utilizing and accelerating the above air stream through the tapering form of the ventilating opening, it is arranged that the size of opening end at one side of the perforated sheet should be preferred as large as possible while the size of opening end at the opposite side thereof as small as possible, and further, the oblique angle of each side of the opening to the sheet plane be maintained different one another.

Figure 24:
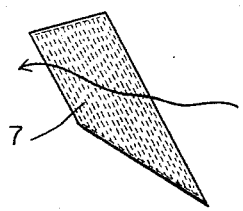
FIG. 24 is an enlarged sectional view showing the rough and uneven inner surface of an opening of rectangular section of the perforated sheet.
Figure 26:
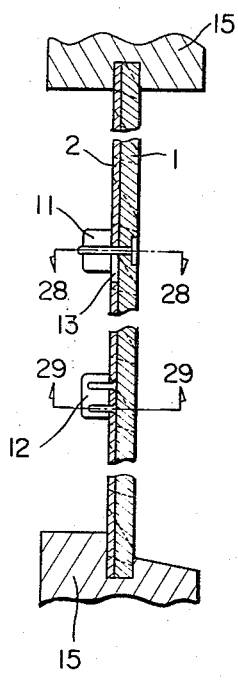
FIG. 26 is a sectional view showing a knob secured to the auxiilary sheet in order to slide it with respect to the principal one, and a stop for securing the auxiliary one to the principal one when displaced, both sheets being installed in the window frame.
Figure 27:
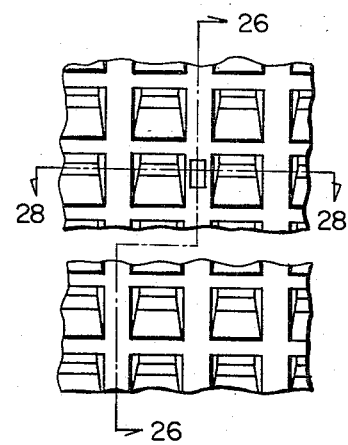
FIG. 27 is a plan view of FIG. 26.
Figure 25:
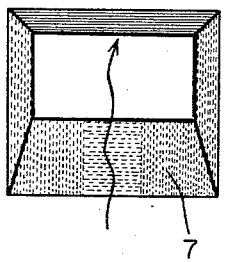
FIG. 25 is a plan view of FIG. 24 facing the opening end of large diameter.
Figure 28:
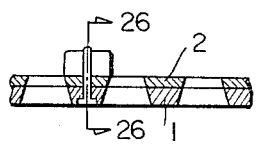
FIG. 28 is a sectional view of the stop of FIG. 26, the stop being screwed up by a screw.
Figure 30:
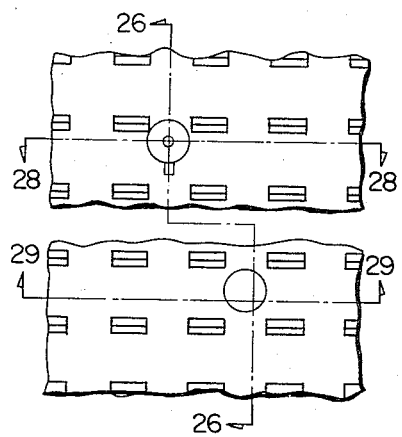
FIG. 30 is a reverse plan view of FIG. 27 in which the knob and the stop are provided.
Figure 29:
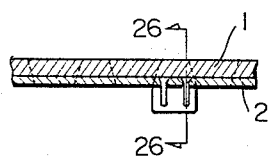
FIG. 29 is a sectional view of the knob of FIG. 26.
Figure 31:
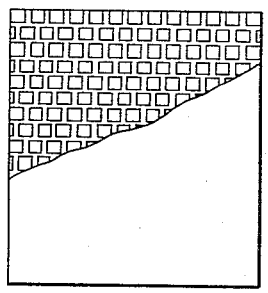
FIGS. 31–35 are reduced views showing various modified arrangements of ventilating openings of various sections, respectively, the region where there is no opening being made of sheet material.
Figure 32:
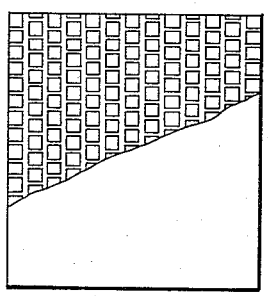
Figure 33:
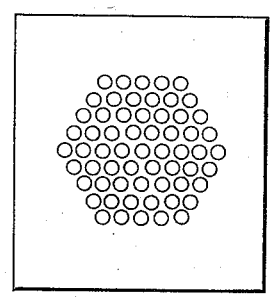
Figure 34:
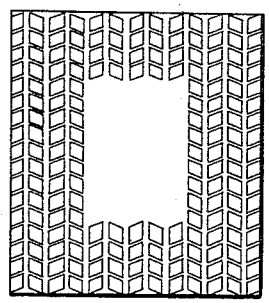
Figure 35:
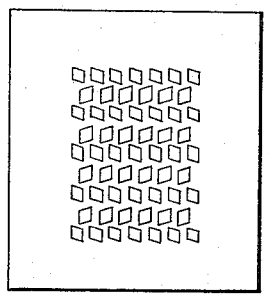

Moreover, the inner face of each opening may be made rough and uneven as desired in FIGS. 24–25, whereby dust contained in the air flow may be filtered off or removed and the invasion of rain or snow may be obviated. It is understood that the smooth inner face of the opening may be employed.

As each opening of the perforated sheet of this invention is formed as described above, it works as if it were a small chimney, the base of which is made as of a larger diameter than that of its top. When the end of large diameter of the ventilating opening is placed face to face with the open air, i.e., outside the window, the air tends to be absorbed into the opening. The air thus absorbed ascends through the upwardly slanting and tapering passage of opening and is gradually constricted into a narrow body of air to discharge out of the end of small diameter with some energy.

Owing to the above function of the upwardly slanting and tapering opening, the action of absorption, ventilation and cleaning by filter can be carried out in an efficient manner, including the prevention of rain or insect by providing an opening end of very small diameter.

As described in FIG. 2, an assembly comprising two perforated sheets of this invention is fixed in the window frame or the like, and a principal perforated sheet 1 is firmly fixed in the groove 10 of the frame 15 while an auxiliary perforated sheet 2 is slidably mounted in the groove 10. It is understood that both principal and auxiliary sheet have a number of similar ventilating openings. However, in reference to the thickness of principal and auxiliary sheet, any thickness will be employed as desired. The examples are shown in FIGS. 16–21, but they are only illustrative and not limited. When the principal sheet is to be firmly fixed, it is preferred to be a thicker one than the auxiliary, but not limited.

It is to be noted that when the principal sheet 1 is juxtaposed with the auxiliary one in the window frame or the like, the opening end of small diameter of the principal sheet should coincide with that of large diameter of the auxiliary one. As described hereinabove, air enters into the opening end of large diameter to pass the openings of both principal and auxiliary sheet to discharge therefrom, so it follows that when the opening end of large diameter of the principal sheet is placed outside the window, in other words, face to face with the open air, the air enters indoors through the opening, while, on the other hand, when the opening end of large diameter of a relatively thick auxiliary sheet is placed face to face indoors, the indoor air discharges out of the room through the openings of both sheets into the open.

The auxiliary sheet 2 is slidably mounted because it functions in order to close the opening of the principal sheet partially or completely. FIGS. 4–8 show how to open, close partially and close completely. It is to be noted that space or room to close the number of openings of the principal sheet 1 is provided on the auxiliary one 2.

In FIGS. 26–30, there are shown a knob 12 for sliding the auxiliary sheet up and down or left and right or in any desired direction, and a stop 11 for securing the auxiliary sheet 2 to the principal one temporarily. The direction of displacing the auxiliary sheet 2 may be any one as desired. It is understood that space or room for displacing a predetermined distance of the auxiliary sheet may be provided in the groove of the window frame (not shown) in a known manner.

As described above, when two perforated sheets, principal and auxiliary, are employed, an easy and safe control of the ventilating openings 3, such as, open, half open and close them, is effected by sliding the auxiliary sheet a little distance.

In addition, it is possible to place the auxiliary perforated sheet side by side the principal one in an entirely opposite manner as shown in FIGS. 10–15, and also possible to use the above two sheet in any desired condition, such as, open, half open, and close, but the open condition thereof is not shown in the drawings.

Where no control of ventilating openings is required in a certain use, only one sheet of the perforated one having a number of tapering openings in accordance with the present invention may be employed. In general, the assembly consisting of two perforated sheets is most adapted where an open, half open or closed condition is desired.

Novel effects and advantages realized by the novel construction of the perforated sheet of this invention hitherto unable to be accomplished by any conventional means are described hereinbelow: when the assembly consisting of two perforated sheets side by side is employed, and desired condition of open, half open or closed may be realized; in case of the use of a single sheet of perforated one, the inner face of tapering opening is preferably provided with a rough and uneven surface. With the rough inner face of ventilating opening, on account of friction, impact and constriction applying to the air flow passing through the opening, fine particles, such as, dust and germs tend to deposit on the rough face. As a result, an effective filtering and cleaning action for dust-laden gas can be carried out.

Further, it has been found that a cooling action is effected at the same time through ventilation. On account of this cooling action, where synthetic resin is used as a material for the perforated sheet of this invention, softening of plastic sheet due to the heat of sunshine can be obviated.

It is also one of the features of this invention that all the doors and windows can be locked with ventilation at all times, which is comfortable in summer.

In case of a single sheet of perforated one, if the opening end of small diameter is made as small as possible, it is possible to prevent rain, snow, insect, dust, germ and sound (noise) from invasion without recourse to the provision of a screen, and besides, obtain transluence due to the interception of direct sunlight.

When the assembly of two perforated sheets is employed, the extent or degree of opening of the ventilating opening of the principal perforated sheet can be adjusted as desired by sliding the auxiliary sheet with respect to the stationary principal one.

By this adjustment of the extent of opening, an appropriate control and maintenance of temperature and humidity within the room can be attained. In reference to natural lighting, it makes no difference whether closed or open as far as a transparent material is used as a sheet. When closed, even blizzard or cold may be avoided or reduced. As described in connection with FIG. 10, when the principal sheet is changed for the auxiliary one in an opposite manner in the two sheet assembly, both absorption and discharge of air may be effected.

Owing to many advantages and objects of the perforated sheet in accordance with the present invention, we can dispense with miscellaneous accessories and devices, such as shutter, louver, screen, blind, ordinary glass pane, visor, mosquito net, and insecticide, etc. Only one kind of the multi-purpose perforated sheet can do many purposes all the year round with a simple adjustment. It can be applied to all kinds of windows and doors, such as, counter-balanced window, bay window, casement window, sliding door, swing door, trap or overhang door and the like.

With a simple adjustment, the composite perforated sheet of this invention can remove ill odor, obnoxious gas and germs from indoor to outdoor. Through the perforated sheet we can look outdoors, but we cannot peep into the room, so when an unwelcome visitor stands at the door, we can descern him at once through the perforated sheet.

Accordingly, the perforated sheet of this invention is adapted for all kinds of houses and buildings, ships, vehicles, living quarters, and animal cages, and more particularly, windows and doors for hospital, dining-room, kitchen, office, factory and toilet, etc., and will be able to develop its full capacity with a fan or blower installed near the sheet.

In the manufacture of the perforated sheet of this invention, it is adapted for mass production because it is easy and convenient in stripping a finished sheet out of the mold due to the taper form of ventilating openings, and further, from an economical point of view, it saves a lot of material per sheet since it has a number of boreholes.

Figure 22:
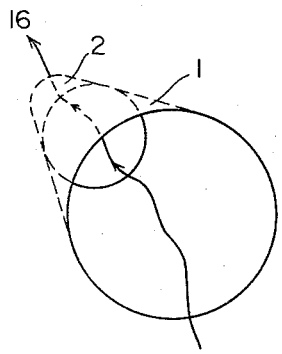
FIG. 22 is a perspective view of a tapering ventilating opening of a circular section instead of the rectangular one in the perforated sheet of this invention, showing the open condition wherein each opening coincides with each one of the two sheet assembly and facing the opening end of large diameter.
Figure 23:
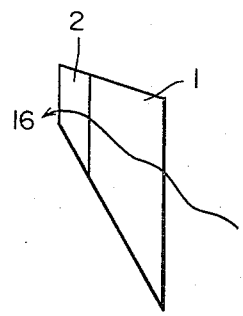
FIG. 23 is a sectional view of FIG. 22.

As shown in FIG. 22, the section of a ventilating opening of the multi-purpose perforated sheet of this invention may be formed as of circle instead of rectangle or trapezoid.

In addition, modified various arrangements of a number of ventilating openings over the perforated sheet of this invention are shown in FIGS. 31-35.

Besides, a circulating ventilation from bottom to top in the room is provided if the perforated sheet whose absorbing plane, i.e., the opening end of large diameter being on the surface, confronting indoors is installed at the upper portion of the wall or the transom window while the same sheet whose absorbing plane confronting outdoors installed at the lower portion or wainscot or vice versa in responsive to the condition of a season all the year round.

Except the kinds of material described hereinbefore adapted for the manufacture of perforated sheet of this invention, slate and cement slab may be employed, and it is understood that a reinforcing substance, such as metal wire or glass fiber may be embedded in the sheet material in order to reinforce it.

It is thought that the invention and many attendant advantages will be understood from the foregoing description and it will be apparent that various modifications may be made in the form, construction, and arrangement of the parts without departing from the spirit and scope of the invention, the form hereinbefore described being merely a preferred embodiment thereof.

I claim:

1. In combination, a perforated sheet having a number of openings, each of said openings being uniformly tapered from one end to the other and having one end of relatively large diameter on one side of said sheet and the other end of relatively small diameter on the other side thereof, and the top of a cross-section of said opening being at an angle of about 105 degrees to the plane of said sheet and the bottom of a cross-section of said opening being at an angle of about 30 degrees to the plane of said sheet, and a second perforated sheet slidably mounted against said first sheet, the openings in said second sheet coinciding with the openings in the first sheet when said second sheet is in one position and having the ends the same size and shape as the ends of the openings in said one sheet which are adjacent said other sheet, and said openings in said second sheet tapering in the same direction and at the same angle as the openings in said one sheet, whereby when the openings in said two sheets coincide they form a single uniformly tapered bore through both sheets.

2. A perforated sheet as set forth in claim 1 in which the inner face of each of said openings is smooth.

3. A perforated sheet as set forth in claim 1 in which the inner face of each of said openings is rough.

4. A window construction comprising a frame, at least one perforated sheet firmly mounted in said frame, said perforated sheet having a number of openings, each of said openings being uniformly tapered from one end to the other and having one end of relatively large diameter on one side of said sheet and the other end of relatively small diameter on the other side thereof, and the top of a cross-section of said opening being at an angle of about 105 degrees to the plane of said sheet and the bottom of a cross-section of said opening being at an angle of about 30 degrees to the plane of said sheet and a second perforated sheet slidably mounted in said frame and slidable against said first sheet, said openings in said second sheet coinciding with the openings in the first sheet when said second sheet is in one position, said openings in said second sheet having the ends the same size and shape as the ends of the openings in said one sheet which are adjacent said other sheet, and said opening in said second sheet tapering in the same direction and at the same angle as the openings in said one sheet, whereby when the openings in said two sheets coincide they form a single uniformly tapered bore through both sheets.

References Cited

UNITED STATES PATENTS

| | | | |
|---|---|---|---|
| 924,479 | 6/1909 | Loehler | 98—99.8 |
| 2,082,335 | 6/1937 | Hart | 98—101 |
| 2,423,241 | 7/1947 | Kurth et al. | 98—40 |
| 2,576,848 | 11/1951 | Mercier et al. | 98—41 |
| 2,807,992 | 10/1957 | Ehman | 98—40 |
| 2,870,700 | 1/1959 | Harrington | 98—96 |
| 2,976,795 | 3/1961 | Brugler | 98—40 |

ROBERT A. O'LEARY, *Primary Examiner.*

M. A. ANTONAKAS, *Assistant Examiner.*